INVENTOR.
LEHMAN EDWARD HOAG
ROLAND NORBERT WENDRICKS
BY Robert P. Auber
George W. Reiber
ATTORNEYS

United States Patent Office 3,113,899
Patented Dec. 10, 1963

3,113,899
DIELECTRIC SEALING OF THERMOPLASTIC
COATED FIBREBOARD
Lehman Edward Hoag, Cary, and Roland Norbert Wendricks, Barrington, Ill., assignors to American Can Company, New York, N.Y., a corporation of New Jersey
Filed Dec. 28, 1960, Ser. No. 78,963
8 Claims. (Cl. 156—273)

This invention relates to a method of dielectric sealing of thermoplastic coated fibrous material and has particular reference to radio frequency dielectric heat sealing of polyethylene coated paper, cardboard, fibreboard, and the like.

Considerable difficulty has been experienced in the past by the use of the heat and pressure method of bonding an overlapped seam area due to the necessity of raising the temperature to provide for quick penetration of sufficient heat to the interior of the material for satisfactory bonding. The wide range and rapid change of temperature between the outer and inner surfaces of the layers or plies of the fibreboard has frequently caused scorching or undesirable discoloration of the exterior surface of the fibreboard adjacent the seam.

The present invention involves bonding of overlapped marginal edge portions of layers of polyethylene coated fibreboard by the use of radio frequency dielectric heating wherein frequency waves are established which pass through the layers and have their effect on the fibreboard. The loss factor of the fibreboard causes a rapid increase in the temperature of the fibreboard, which in turn causes heating of the plastic material at the line of bond. The temperature rise is largely dependent on the moisture contained in the fibreboard with the greatest heat being created at the center of the layers which is conducted to the plastic coating and is sufficient to provide a suitable bond being formed between the layers.

In the operation of the invention, the electrodes through which the radio frequency current flows producing the dielectric heating are used to exert pressure on concentrated portions of the overlapped seam area being bonded. This permits the use of greater radio frequency power, which in turn reduces the time required for sealing, provides a stronger bond, and reduces arcing.

An object of the instant invention is the provision of a method of heat sealing or bonding together overlapped marginal edge portions of thermoplastic coated paper, cardboard, fibreboard, or the like by radio frequency dielectric heating.

Another object is the provision of such a method of bonding thermoplastic coated fibreboard by exerting concentrated pressure on the plastic coated fibreboard while applying radio frequency and high potential voltages in such a manner so as to utilize the alternating stresses introduced in the material for heating purposes.

A further object is the provision of such a method wherein a stronger bond is obtained between layers of polyethylene coated fibreboard by exerting a relatively great pressure on a concentrated portion of a seam area while the coated fibreboard is subjected to radio frequency dielectric heating.

Another object is the provision of such a method wherein the concentration of greater pressure on a predetermined portion of a lap seam permits the use of greater radio frequency power which reduces the sealing time required.

A further object is the provision of such a method wherein the concentration of pressure applied on a lap seam portion is along a plurality of parallel and spaced apart narrow elongate lines within the overlapped seam area.

Numerous other objects and advantages of the invention will be apparent as it is better understood from the following description, which, taken in connection with the accompanying drawings, discloses a preferred embodiment thereof.

Referring to the drawings.

Figure 1:
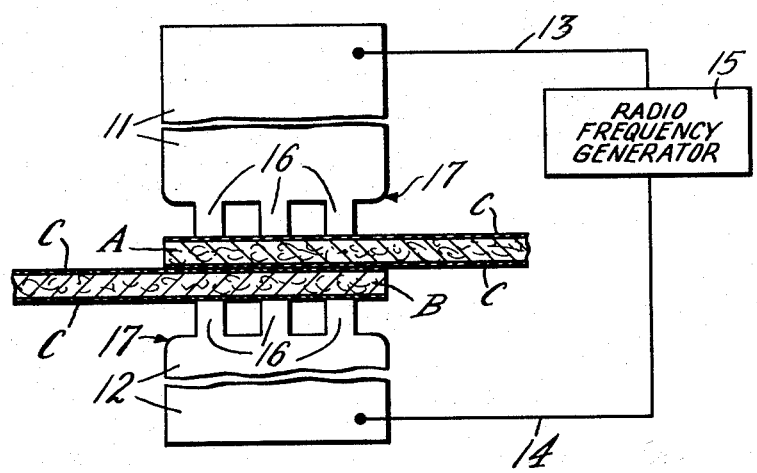
FIGURE 1 is a sectional view illustrating two thermoplastic coated fibreboards disposed in overlapped position for being bonded together between a pair of electrodes and exemplifying a preferred arrangement for performing the steps of the instant invention.

As a preferred or exemplary embodiment of the instant invention, FIGURE 1 of the drawing illustrates a method of bonding overlapped layers or marginal edge portions of fibreboard coated with a thermoplastic material such as polyethylene by the use of radio frequency dielectric heating and a concentration of pressure being applied to a confined area of the overlapped portions.

The fibreboard to be bonded may be in the form of relatively thin web stock, sheets, blanks prepared for article manufacture, and the like, and are herein designated as upper and lower fibreboards A and B, each of which is coated on the opposite surfaces thereof with polyethylene C previously secured thereto by any suitable means. The fibreboard A, B may vary in thickness between .011 inch and .023 inch, with an average thickness of .017. The coating of polyethylene applied to the boards varies in thickness between ½ mil and 2 mils (.0005 inch to .002 inch), with an average of 1 mil (.001 inch) preferred.

The marginal edge portions of the fibreboards A and B to be joined preferably are arranged in an overlapped relation (FIGS. 1, 3 and 4), with at least one single layer of the polyethylene coating disposed intermediate the layers of fibreboards A and B, at which time both the dielectric heat and pressure may be applied.

For the purpose of performing the method steps of the instant invention, the overlapped edge portions of the coated fibreboards A and B are positioned between a pair of upper and lower electrodes 11 and 12 (FIG. 1) which apply both the dielectric current and pressure necessary for bonding the marginal edge portions together.

The radio frequency current, which generates the heat for sealing, is supplied to the electrodes 11, 12, and hence these electrodes are connected by suitable lead wires 13, 14 to a radio frequency generator 15.

The dielectric frequency range is approximately 1 to 500 megacycles, with the most used frequency range lying between 5 and 30 megacycles, although frequencies up to 50 megacycles may be used when operations are performed with machinery designed in a manner to avoid large masses of metal near the electrodes.

In order to apply pressure to the overlapped marginal edge portions, the electrodes 11, 12 are positioned securely in a press mechanism which may be operated to exert pressures in excess of 500 pounds per square inch on the electrodes and through them onto a reduced area of the marginal edge portions for bonding purposes. It has been found that a greater or increased pressure applied on a concentrated area of the marginal edge portions by the electrodes has the following important advantages:

(1) Produces a stronger bond between the overlapped marginal edge portions;
(2) Permits the use of greater radio frequency power;
(3) Reduces the time required for sealing;
(4) Reduces arcing at the seam area.

The greater or increased pressure is produced by confining the actual pressure applied to the electrodes onto a predetermined or concentrated area of the overlapped portions so that a greater effective pressure per unit area, e.g. approximately 5000 pounds per square inch, is made available at the points of contact. This increased pressure causes greater penetration of the polyethylene into the fibre at the points of area of contact, resulting in a stronger bond between the layers of fiberboard A, B.

Further, the relatively high pressure serves to compress the fibre which decreases its impedance to radio frequency current and thus decreases the voltage drop occurring at the edge of the paper at the overlap. This, in turn, increases the radio frequency power per unit of contact area, permitting a greater rate of flow at the concentrated area. Thus heat is supplied at a more rapid rate.

Moreover, the increase of pressure applied by the electrodes at predetermined points of concentration from opposite sides of the overlapped marginal edge portions results in a direct reduction in the time required for producing a seal. Satisfactory seals thus have been obtained in .05 second when applying pressures of 5000 pounds per square inch.

The area of contact of the electrodes on the overlapped portions of the fibreboard has a direct bearing upon arcing. This arcing can be controlled by positioning of the points of contact inwardly of the terminal edges of the fiberboard, and this in effect increases the air gap between the electrodes adjacent and along the edges of the seam.

Figure 2:
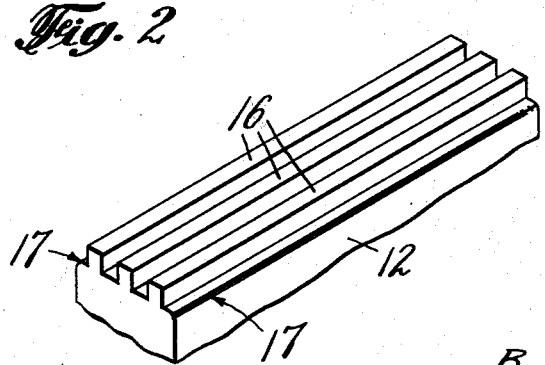
FIG. 2 is a perspective view showing the details of one of the electrodes appearing in FIG. 1.

These advantages are accomplished by the specially designed upper and lower electrodes 11, 12 (FIG. 1) which are substantially identical and, for the purpose of this invention, are formed to exert a greater or increased pressure on concentrated or predetermined points of contact within the overlapped marginal edge portions. Hence, for this purpose, the electrodes are elongate in form and of a width substantially equal to the width of the overlapped portions of the fibreboards being bonded. Details of such electrodes are shown in the perspective view (FIG. 2), which illustrates the lower electrode 12 provided with a crenelated or corrugated pressure-exerting face defined by a plurality of parallel and spaced-apart narrow, elongate bars 16.

In order to realize the advantages of a crenelated electrode, it has been found that the width of each bar 16 be less than the width and the depth of the space between adjacent bars. By way of example, bars having a thickness of .050 inch, with a width of space of .062 inch and a depth of .050 to .062 inch have produced satisfactory results.

The bars 16, preferably three in number, extend longitudinally of the electrodes and are spaced inwardly from each of the outer side edges thereof. With the bars arranged in this manner, the points of concentration are substantially along spaced lines, narrow bands, or ribbons, which confine the seal produced within the overlapped portions.

In order to apply the increased pressure effectively on the concentrated area of the overlapped portions of the fibreboard, the bars 16 of the electrodes 11, 12 (FIG. 1) preferably are positioned in direct opposing relation to exert high localized pressures to the overlapped portions.

It can readily be seen that the reduction of one-half or more of the over-all area or width of the electrodes results in an increase in the effective pressures concentrated on the confined or predetermined area of the overlapped portions of the fibreboards being bonded or joined together. In order to further reduce the possibility of arcing, sharp corners along the outer longitudinal edges of the electrodes 11, 12 are avoided and hence the corners preferably are rounded, as at 17.

Figure 3:
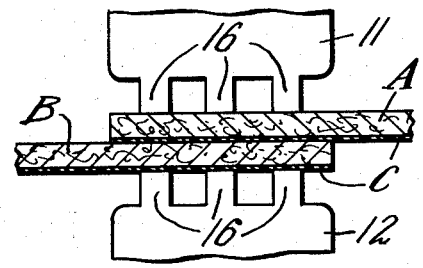
FIG. 3 is a sectional view showing fragmentary marginal edge portions of fibreboard arranged in overlapped position preparatory to being bonded together, each of the fibreboards having one surface thereof coated with thermoplastic material.

FIG. 3 of the drawings illustrates another form of overlapped marginal portions of fibreboards A, B having a coating of polyethylene C applied to one surface of each of the fibreboards. With the fibreboards disposed in the position illustrated, namely, with one of the coated surfaces of one of the fibreboards positioned intermediate the overlapped marginal edge portions, these fibreboards may likewise be secured together by the electrodes 11, 12.

Figure 4:
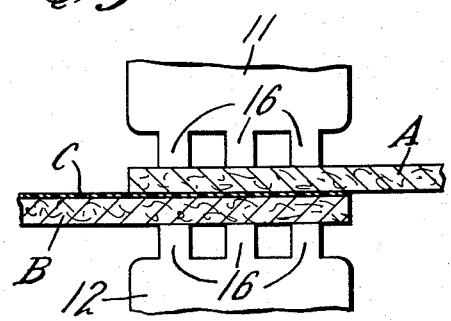
FIG. 4 is a view similar to FIG. 3 showing only one of the fibreboards coated with thermoplastic material.

FIG. 4 of the drawings illustrates another form of overlapped marginal portions of fibreboards A, B, wherein only one of the fibreboards, either A or B, has a single coating of polyethylene C applied to only one of its surfaces. With the fibreboards disposed in the position as illustrated, namely, with the coated surface on a single coated fibreboard positioned intermediate the overlapped marginal edge portions, these fibreboards may also be secured together by the electrodes 11, 12.

It is thought that the invention and many of its attendant advantages will be understood from the foregoing description and it will be apparent that various changes may be made in the steps of the method described and their order of accomplishment without departing from the spirit and scope of the invention or sacrificing all of its material advantages, the method hereinbefore described being merely a preferred embodiment thereof.

We claim:

1. A method of bonding together relatively thin fibreboards at least one of which has a thermoplastic coating thereon, comprising the steps of: overlapping the marginal edge portions of said fibreboards with said thermoplastic disposed therebetween; positioning said overlapped edge portions between a pair of spaced-apart elongate electrodes, each electrode comprising a plurality of longitudinally extending crenels with the crenels of one electrode opposed to the crenels of the other electrode; exerting at least 500 p.s.i. upon and urging said electrodes together and compressing said edge portions between the reduced contact area of said crenels whereby said urging force is at least twice said pressure exerted upon said electrodes and is concentrated on said edge portions between said opposed crenels; and passing a radio frequency current in which the frequency lies between 1 and 500 megacycles through said electrodes for a period from 0.01 to 0.5 second thereby dielectrically heating said thermoplastic coating between said opposed crenels, and sealing together said edge portions between said opposed crenels.

2. The method of claim 1 wherein said compressing is concentrated inwardly of the elongate edges of said electrodes thereby reducing the tendency of arcing between said electrodes during the passage of current.

3. The method set forth in claim 1 wherein said heated thermoplastic coating penetrates said fibreboards during said sealing.

4. The method as defined in claim 1 wherein the fibreboards provided for bonding are coated on each of their opposite surfaces with a thermoplastic material.

5. The method as defined in claim 1 wherein the fibreboards provided for bonding are coated on one surface thereof with a thermoplastic material and wherein the coated surface on one of the fibreboards is disposed intermediate the overlapped marginal edge portions being bonded.

6. The method as defined in claim 1 wherein the fibreboards provided for bonding include an uncoated fibreboard and a fibreboard having only one of its surfaces coated with a thermoplastic material, and wherein the coated surface on said coated fibreboard is disposed intermediate the overlapped marginal edge portions being bonded.

7. The method as defined in claim 1 wherein the thermoplastic coating on the fibreboards provided for bonding is polyethylene.

8. The method of claim 1 wherein the frequency of said radio frequency current lies between 5 and 30 megacycles.

References Cited in the file of this patent

UNITED STATES PATENTS

| | | |
|---|---|---|
| 2,514,197 | Groten et al. | July 4, 1950 |
| 2,550,006 | Dreyfus | Apr. 24, 1951 |
| 2,631,642 | Richardson | Mar. 17, 1953 |
| 2,711,828 | Webb | June 28, 1955 |
| 2,734,982 | Gillespie | Feb. 14, 1956 |
| 2,922,865 | Schattler | Jan. 26, 1960 |
| 2,946,713 | Dusina | July 26, 1960 |